United States Patent
Lee et al.

(10) Patent No.: US 8,984,345 B2
(45) Date of Patent: Mar. 17, 2015

(54) FAULT RESTORATION APPARATUS AND METHOD FOR USE IN A VIRTUAL ENVIRONMENT

(75) Inventors: Sung-Min Lee, Suwon-si (KR); Sang-Bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 587 days.

(21) Appl. No.: 13/155,897

(22) Filed: Jun. 8, 2011

(65) Prior Publication Data

US 2012/0084602 A1    Apr. 5, 2012

(30) Foreign Application Priority Data

Oct. 4, 2010    (KR) .................. 10-2010-0096579

(51) Int. Cl.
  *G06F 11/00*    (2006.01)
  *G06F 11/14*    (2006.01)
  *G06F 11/07*    (2006.01)

(52) U.S. Cl.
  CPC ........ *G06F 11/1484* (2013.01); *G06F 11/0712* (2013.01); *G06F 11/0793* (2013.01); *G06F 11/1438* (2013.01); *G06F 11/1469* (2013.01)
  USPC .......................................... 714/38.1; 714/15

(58) Field of Classification Search
  None
  See application file for complete search history.

(56) References Cited

U.S. PATENT DOCUMENTS

| | | | |
|---|---|---|---|
| 6,173,417 B1* | 1/2001 | Merrill | 714/15 |
| 2002/0147873 A1* | 10/2002 | Kwon et al. | 710/200 |
| 2007/0055914 A1* | 3/2007 | Chandwani et al. | 714/47 |
| 2007/0244938 A1 | 10/2007 | Michael et al. | |
| 2009/0182929 A1 | 7/2009 | Hwang et al. | |
| 2010/0115512 A1 | 5/2010 | Sakai | |
| 2010/0162052 A1* | 6/2010 | Shimogawa | 714/48 |
| 2011/0252271 A1* | 10/2011 | Frenkel et al. | 714/4.1 |

FOREIGN PATENT DOCUMENTS

| | | |
|---|---|---|
| JP | 2010-108260 | 5/2010 |
| KR | 10-2003-0052015 | 6/2003 |
| KR | 10-2009-0005330 | 1/2009 |
| KR | 10-2009-0079012 | 7/2009 |

\* cited by examiner

*Primary Examiner* — Scott Baderman
*Assistant Examiner* — Jason Bryan
(74) *Attorney, Agent, or Firm* — NSIP Law

(57) ABSTRACT

A fault restoration technique for use in a virtual environment is provided. The fault restoration technique includes monitoring fault state values of a plurality of domains, detecting a faulty domain, if any, from the plurality of, and restoring the faulty domain by reloading the OS of the faulty domain.

17 Claims, 3 Drawing Sheets

FAULT RESTORATION APPARATUS AND METHOD FOR USE IN A VIRTUAL ENVIRONMENT

CROSS-REFERENCE TO RELATED APPLICATION(S)

This application claims the benefit under 35 U.S.C. §119 (a) of Korean Patent Application No. 10-2010-0096579, filed on Oct. 4, 2010, in the Korean Intellectual Property Office, the entire disclosure of which is incorporated herein by reference for all purposes.

BACKGROUND

1. Field

The following description relates to a fault restoration technique, and more particularly, to a fault restoration apparatus and method for use in a virtual environment.

2. Description of the Related Art

Applications and/or services provided by a device that uses a single operating system (OS) may all become unavailable upon the occurrence of a system fault or damage to the OS. On the other hand, in a device using multiple OSs, at least some applications or services in the device may still be available even when one or more of the OSs become faulty due to, for example, a computer virus.

However, in the case of a device equipped with multiple OSs, as is the case of a device equipped with a single OS, the applications and/or services installed by a faulty OS are not able to be used until the faulty OS is properly restored.

SUMMARY

In one general aspect, there is provided a fault restoration apparatus for use in a virtual environment in which a plurality of domains each having an operating system (OS) and one or more applications are run, the fault restoration apparatus including a domain monitoring unit configured to monitor fault state values of the plurality of domains, a fault determination unit configured to compare the fault state values of the plurality of domains with a threshold and detect a faulty domain from the plurality of domains based on the results of the comparison, and a fault restoration unit configured to restore the faulty domain.

The fault state values of the plurality of domains may include counter values that increase periodically.

The fault determination unit may determine a domain that has a counter value that does not increase for a predefined amount of time as the faulty domain.

The fault determination unit may determine a domain that has a counter value that is updated less than a predefined number of times during a predefined amount of time as the faulty domain.

The fault restoration unit may restore the faulty domain by reloading the OS of the faulty domain.

In response to the faulty domain not being restored by reloading the OS of the faulty domain, the fault restoration unit may restore the faulty domain using backup data of the faulty domain.

Backup data of each of the plurality of domains may be stored in one of the plurality of domains selected as a main domain and the fault restoration unit may restore the faulty domain using the backup data in the main domain.

Backup data of each of the plurality of domains may be stored in a server and the fault restoration unit may restore the faulty domain using the backup data in the server.

Backup data of each of the plurality of domains may be stored in a network file system (NFS) and the fault restoration unit may restore the faulty domain using the backup data in the NFS.

The backup data of the faulty domain may include an OS kernel image at the time of shipment of the faulty domain, information on a number of applications installed by the OS of the faulty domain, system configuration information set or updated by the OS of the faulty domain, and user data information set or updated by a user of the faulty domain.

Backup data of a faulty domain may be backed up to a server or one of the plurality of domains selected as a main domain, and the backup data of the faulty domain may also be backed up to at least one non-main domains.

In another aspect, there is provided a fault restoration method for use in a in a virtual environment in which a plurality of domains each having an OS and one or more applications are run, the fault restoration method including monitoring fault state values of the plurality of domains, detecting a faulty domain from the plurality of domains by comparing the fault state values of the plurality of domains with a threshold, and restoring the faulty domain by reloading the OS of the faulty domain.

The fault state values of the plurality of domains may include counter values that increase periodically.

The detecting of the faulty domain may comprise determining a domain that has a counter value that does not increase for a predefined amount of time as the faulty domain.

The detecting of the faulty domain may comprise determining a domain that has a counter value that is updated less than a predefined number of times during a predefined amount of time as the faulty domain.

In response to the faulty domain not being restored by reloading the OS of the faulty domain, the method may further comprise restoring the faulty domain using backup data of the faulty domain.

The restoring of the faulty domain may comprise restoring the faulty domain using backup data present in at least one of an NFS and one of the plurality of domains selected as a main domain.

The backup data of the faulty domain may include an OS kernel image at the time of shipment of the faulty domain, information on a number of applications installed by the OS of the faulty domain, system configuration information set or updated by the OS of the faulty domain, and user data information set or updated by a user of the faulty domain.

The backup data of the faulty domain may be backed up to a server or one of the plurality of domains selected as a main domain, and the backup data of the faulty domain may be further backed up to at least one of the other non-main domains.

In another aspect, there is provided a fault restoration apparatus for use in a virtual environment, the fault restoration apparatus including a domain monitoring unit configured to monitor fault state values of at least one operating system, a fault determination unit configured to compare the fault state value of the at least one operating system with a threshold and configured to determine whether the at least one operating system is a faulty operating system based on the comparison, and a fault restoration unit configured to restore the faulty operating system.

Other features and aspects may be apparent from the following detailed description, the drawings, and the claims.

Figure 1:
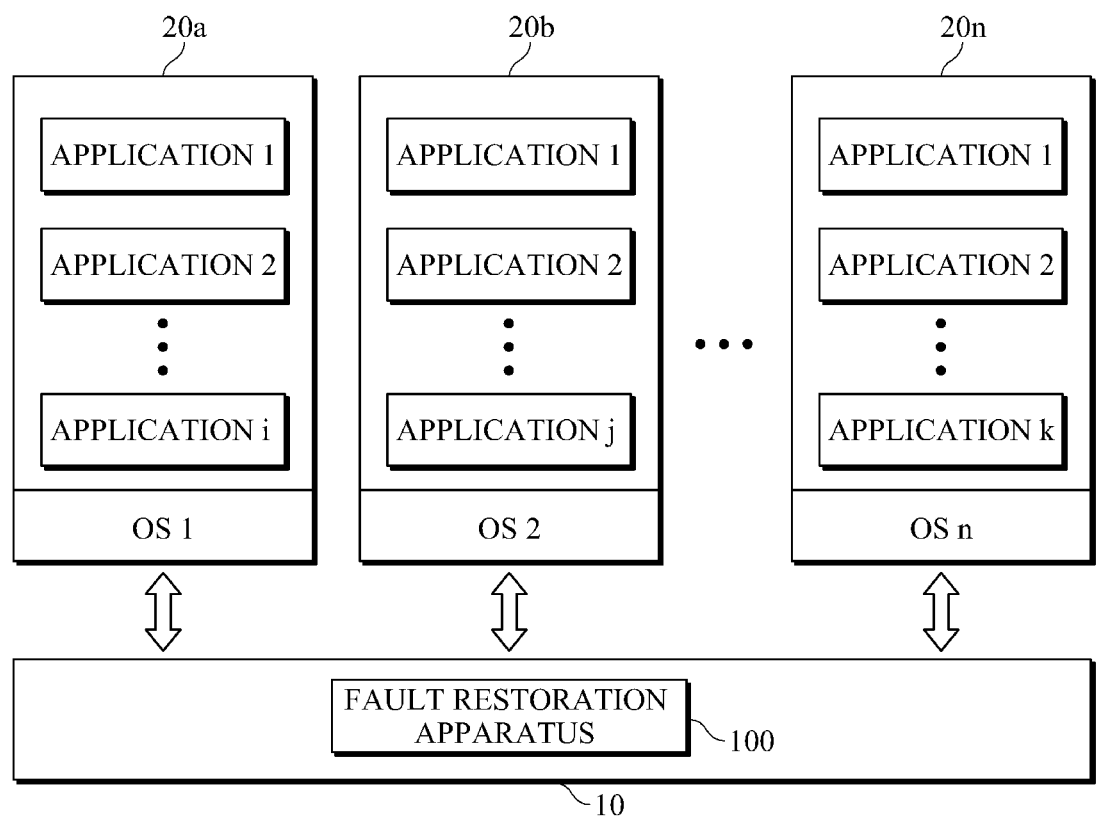
FIG. 1 is a diagram illustrating an example of a fault restoration apparatus for use in a virtual environment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a fault restoration apparatus for use in a virtual environment.

Referring to FIG. 1, fault restoration apparatus 100 runs a plurality of domains 20a through 20n in a single device. In response to a fault occurring in one of the domains 20a through 20n, the fault restoration apparatus 100 may restore the faulty domain. Each of the domains 20a through 20n may include an operating system (OS) and at least one application. While the example of FIG. 1 includes a plurality of domains 20 through 20n in a single device, it should be appreciated that the fault restoration apparatus 100 may monitor a single domain including a single OS.

As an example, the fault restoration apparatus 100 may be implemented with a virtual software program 10, for example, a hypervisor that is installed in hardware. Also, the fault restoration apparatus 100 may be included in various devices, for example, a computer, a mobile terminal, an MP3 player, and the like.

Figure 2:
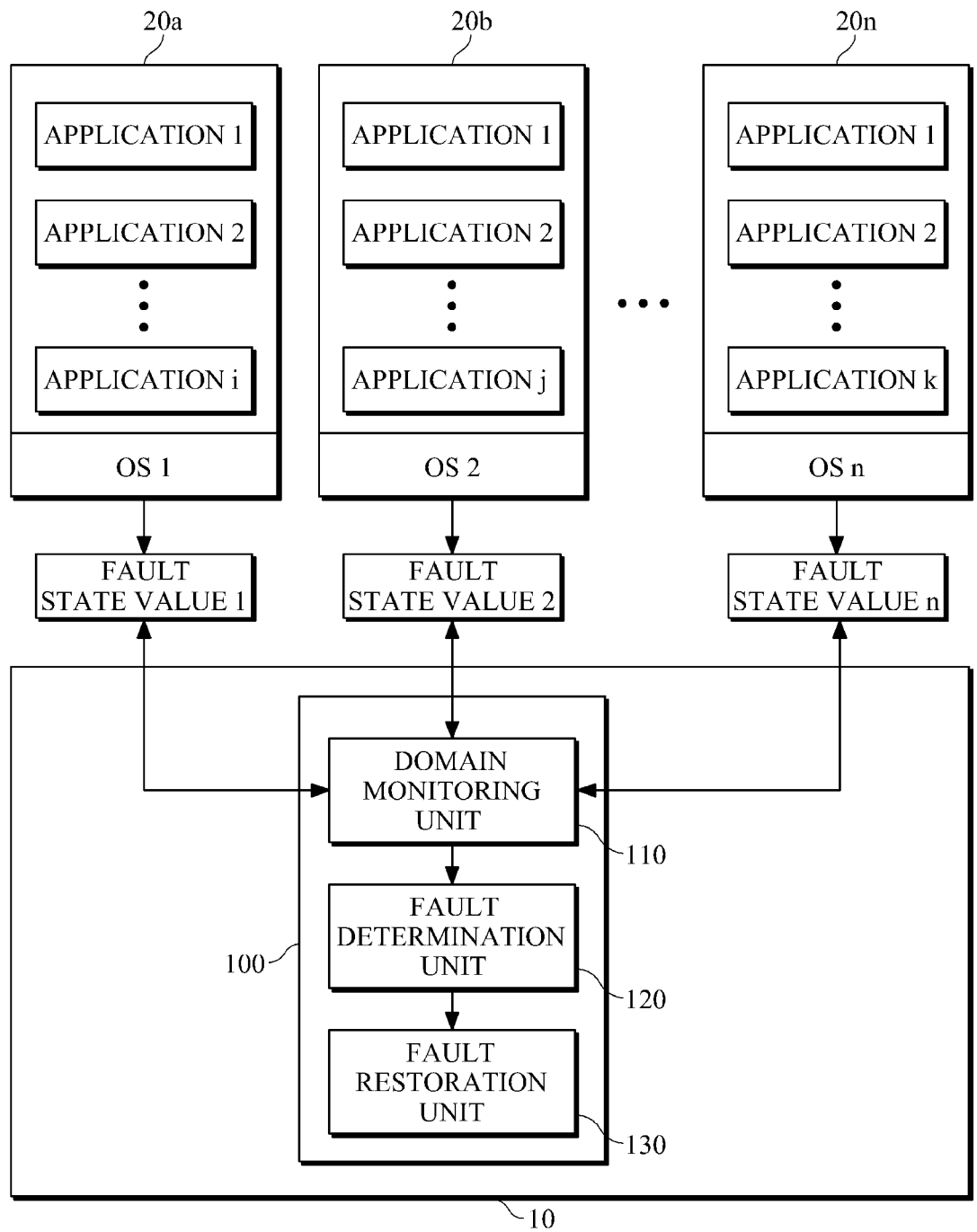
FIG. 2 is a diagram illustrating another example of a fault restoration apparatus.

FIG. 2 illustrates another example of fault restoration apparatus.

Referring to FIG. 2, fault restoration apparatus 100 includes a domain monitoring unit 110, a fault determination unit 120, and a fault restoration unit 130.

The domain monitoring unit 110 may monitor the fault states of the domains 20a through 20n. For example, the domain monitoring unit 110 may monitor the fault state values of the domains 20a through 20n. The fault state values of the domains 20a through 20n may be counter values that increase periodically. The fault restoration apparatus 100 may store the monitored fault state values in a memory (not shown).

For example, the fault determination unit 120 may determine whether the domains 20a through 20n are faulty by comparing the fault state values of the domains 20a through 20n with a predefined threshold.

In an example in which the fault state values of the domains 20a through 20n are counter values that increase periodically, the fault determination unit 120 may assume that the counter values will not increase while their respective domains operate abnormally. Accordingly, the fault determination unit 120 may determine that any of the domains 20a through 20n are faulty if a counter value of a respective domain does not increase for a predefined amount of time. As another example, the fault determination unit 120 may determine that any of the domains 20a through 20n are faulty if a counter value of a respective domain is updated less than a predefined number of times during a certain amount of time.

When a fault occurs in one of the domains 20a through 20n, the fault restoration unit 130 may restore the faulty domain, for example, by reloading the OS of the faulty domain.

When a fault occurs because of a memory error occurring in one of the domains 20a through 20n, the faulty domain may easily be restored by reloading the OS thereof. However, when an error occurs, for example, such as a file system breakdown occurs in one of the domains 20a through 20n, the faulty domain may not be able to be restored by simply reloading the OS of the faulty domain.

Thus, when a fault occurs in one of the domains 20a through 20n, and the faulty domain cannot be restored simply by reloading an OS, the fault restoration unit 130 may restore the faulty domain using backup data of the faulty domain. For example, the fault restoration unit 130 may be implemented in a hypervisor. As another example, the fault restoration unit 130 may be implemented in each of the domains 20a through 20n.

Examples of backup data of a domain include, but are not limited to, an OS kernel image, for example, an OS kernel image at the time of shipment of the domain, information on a number of applications installed by the OS of the domain, system configuration information (such as menu configuration information) set or updated by the OS of the domain, user data information (such as phonebook data, message inbox data, banking data) set or updated by a user of the domain, and the like. The backup data may be stored in a memory of the fault restoration apparatus 100 and/or in a memory of a device that includes the fault restoration apparatus 100.

For example, the fault restoration unit 130 may shut down a faulty domain, may set an environment for restoring the faulty domain, and may restore the faulty domain using backup data of the faulty domain.

Referring to the examples in FIGS. 1 and 2, one or more of the domains 20a through 20n may be selected in advance as a main domain. Whenever backed up to a server or the main domain, backup data of each of the domains 20a through 20n may also be backed up to the other non-main domains. Accordingly, if a fault occurs in one of the domains 20a through 20n, the fault restoration unit 130 may restore the faulty domain using the backup data in the non-main domains.

If a fault occurs in one of the domains 20a through 20n, the fault restoration unit 130 may restore the faulty domain with reference to the backup data in the main domain. For example, the fault restoration unit 130 may restore the faulty domain by restoring an OS kernel image, reinstalling one or more applications in the faulty domain, and restoring system configuration information and user data of the faulty domain with reference to the backup data in the main domain. As an example, the restored OS kernel image may be an OS kernel image at the time of shipment of the faulty domain from the manufacturer.

As another example, if a fault occurs in one of the domains 20a through 20n when the backup data of the domains 20a through 20n are stored in a server (not shown), the fault restoration unit 130 may restore the faulty domain by restoring an OS kernel image, reinstalling one or more applications in the faulty domain, and restoring system configuration information and user data of the faulty domain with reference to the backup data in the server.

As another example, the backup data of the domains 20a through 20n may be stored in a network file system (NFS, not shown), which is a file system that allows a plurality of network devices to share files over a network. If a fault occurs in one of the domains 20a through 20n, the fault restoration unit 130 may restore the faulty domain by restoring an OS kernel image, reinstalling one or more applications in the faulty domain, and restoring system configuration information and user data of the faulty domain with reference to the backup data distributed in the NFS.

In this example, OS information of each of the domains 20a through 20n and a list of applications installed in each of the domains 20a through 20n may be stored in one of the domains 20a through 20n. The fault restoration unit 130 may transmit OS information of the faulty domain and a list of applications installed in the faulty domain to a plurality of network devices connected to the NFS or a server. Accordingly, the network devices may be provided with the OS information of the faulty domain and the list of applications installed in the faulty domain.

In certain aspects, when reinstalling applications in the faulty domain, applications that are more essential to the faulty domain may be automatically reinstalled, whereas applications that are less essential to the faulty domain may be reinstalled, for example, upon the request of a user.

In this manner, in a virtual environment in which a plurality of domains are run, it is possible to quickly restore a faulty domain and allow a user to use the applications or services provided by each of the domains without interruption.

Figure 3:
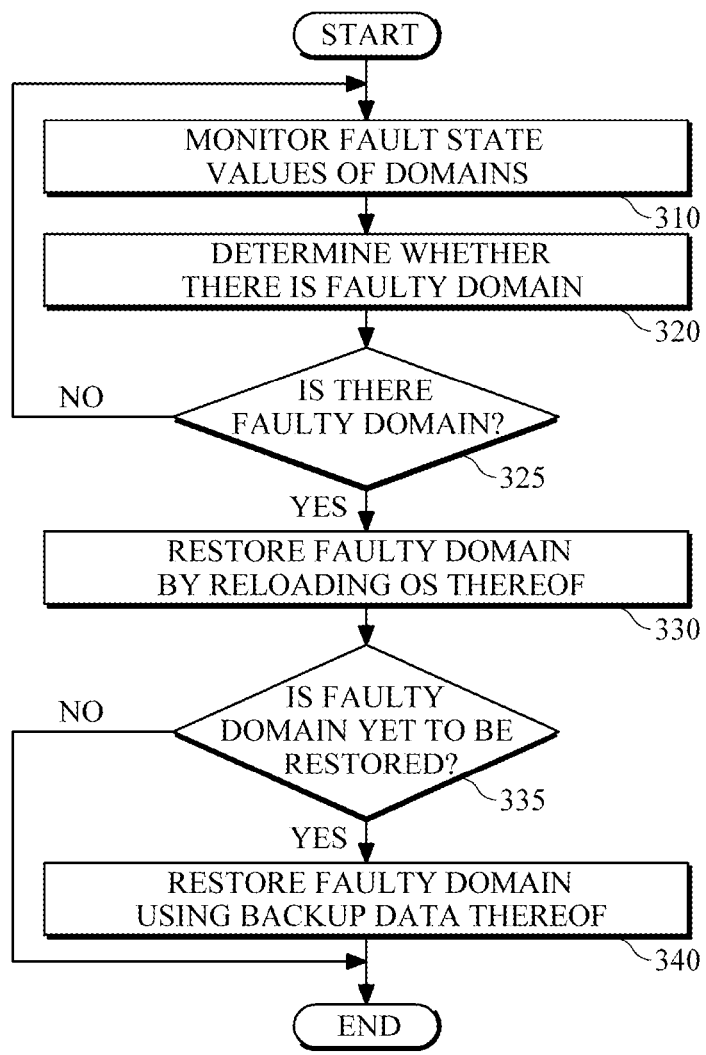
FIG. 3 is a flowchart illustrating an example of a fault restoration method for use in a virtual environment.

Described herein is an example of how a fault restoration apparatus may restore a faulty domain in a virtual environment with reference to FIG. 3.

FIG. 3 illustrates an example of a fault restoration method for use in a virtual environment.

Referring to FIG. 3, a fault restoration apparatus monitors the fault state values of a plurality of domains, in 310. In this example, each domain may have an OS and one or more applications. The fault state values of the plurality of domains may be, for example, counter values that increase periodically. As another example, the fault restoration apparatus may monitor the fault state values of a single domain.

In 320, the fault restoration apparatus compares the fault state values of the plurality of domains with a predefined threshold and may detect a faulty domain, if any, from the plurality of domains. For example, if the fault state values of the plurality of domains are counter values that increase periodically, the fault restoration apparatus may determine any one of the plurality of domains that has a counter value that does not increase for a predefined amount of time or is updated less than a predefined number of times, and may determine that domain as the faulty domain based on the assumption that the counter values are not increasing because the domain is operating abnormally.

In 325, the fault restoration apparatus determines whether there is one or more faulty domains. In 330, if there is a faulty domain, the fault restoration apparatus attempts to restore the faulty domain by reloading the OS of the faulty domain.

If the faulty domain cannot be restored simply by reloading the OS of the faulty domain, in 340 the fault restoration apparatus restores the faulty domain using backup data of the faulty domain.

For example, if the fault that has occurred in the faulty domain is the result of an error such as a memory error, the fault restoration apparatus may more easily restore the faulty domain in 330 by reloading the OS of the faulty domain. However, when the fault that has occurred in the faulty domain is the result of an error such as a fatal error, for example, a file system breakdown, the fault restoration apparatus may not be able to restore the faulty domain in 330 by simply reloading the OS of the faulty domain. In 335 it is determined whether the faulty domain was restored. If the faulty domain was not successfully restored, the fault restoration apparatus uses the backup data of the faulty domain to restore the faulty domain, in 340.

Examples of the backup data of the faulty domain include, but are not limited to, an OS kernel image such as an OS kernel image at the time of shipment of the faulty domain, information on a number of applications installed by the OS of the faulty domain, system configuration information (such as menu configuration information) set or updated by the OS of the faulty domain, and user data information (such as phonebook data, message inbox data, banking data) set or updated by a user of the faulty domain.

For example, the fault restoration apparatus may shut down the faulty domain, may set an environment for restoring the faulty domain, and may restore the faulty domain using the backup data of the faulty domain.

The backup data may be backed up to a server and/or one of the plurality of domains selected in advance as a main domain. As another example, the backup data of each of the plurality of domains may be backed up to the other non-main domains, and the fault restoration apparatus may restore the faulty domain in 340 using the backup data in the non-main domains.

For example, in 340, the fault restoration apparatus may restore the faulty domain by restoring an OS kernel image, reinstalling one or more applications in the faulty domain, and restoring system configuration information and user data of the faulty domain with reference to the backup data in the main domain.

As another example, the backup data of each of the plurality of domains may be stored in a server. In this example, in 340, the fault restoration apparatus may restore the faulty domain by restoring an OS kernel image, reinstalling one or more applications in the faulty domain, and restoring system configuration information and user data of the faulty domain with reference to the backup data in the server.

As another example, the backup data of each of the plurality of domains may be stored in a NFS. In this example, in 340, the fault restoration apparatus may restore the faulty domain by restoring an OS kernel image, reinstalling one or more applications in the faulty domain, and restoring system configuration information and user data of the faulty domain with reference to the backup data distributed in the NFS.

In this example, OS information of each of the plurality of domains and a list of applications installed in each of the plurality of domains may be stored in one of the plurality of domains. The fault restoration apparatus may transmit OS information of the faulty domain and a list of applications installed in the faulty domain to a plurality of network devices connected to the NFS or a server. Accordingly, the network devices may be provided with the OS information of the faulty domain and the list of applications installed in the faulty domain.

In certain aspects, when reinstalling applications in the faulty domain, applications that are more essential to the faulty domain may be automatically reinstalled, whereas applications that are less essential to the faulty domain may be reinstalled upon the request of a user.

As described by various aspects herein, in a virtual environment in which one or more domains are run, and a fault occurs in one of the plurality of domains, it is possible to effectively restore the faulty domain and allow a user to continuously use the applications or services provided by each of the plurality of domains without interruption.

In various aspects, there is described a fault restoration technique for use in a virtual environment in which one or more domains each having an operating system (OS) and one or more applications are run. The fault restoration technique is capable of effectively restoring any faulty one of the plurality of domains. As a result, it is possible to quickly restore any faulty domain and allow a user to continuously use the applications or services provided by each of the plurality of domains without interruption.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fault restoration apparatus for use in a virtual environment in which a plurality of domains each having an operating system (OS) and one or more applications are run, the fault restoration apparatus comprising:
    a domain monitoring unit configured to monitor fault state values of the plurality of domains;
    a fault determination unit configured to compare the fault state values of the plurality of domains with a threshold and detect a faulty domain from the plurality of domains based on the results of the comparison;
    a fault restoration unit configured to restore the faulty domain by reloading the OS of the faulty domain and in response to the faulty domain not being restored by reloading the OS of the faulty domain, the fault restoration unit restores the faulty domain using backup data of the faulty domain; and
    a processor configured to operate at least one of the domain monitoring unit, the fault determination unit, and the fault restoration unit.

2. The fault restoration apparatus of claim 1, wherein the fault state values of the plurality of domains include counter values that increase periodically.

3. The fault restoration apparatus of claim 2, wherein the fault determination unit determines a domain that has a counter value that does not increase for a predefined amount of time as the faulty domain.

4. The fault restoration apparatus of claim 2, wherein the fault determination unit determines a domain that has a counter value that is updated less than a predefined number of times during a predefined amount of time as the faulty domain.

5. The faulty restoration apparatus of claim 1, wherein backup data of each of the plurality of domains is stored in one of the plurality of domains selected as a main domain and the fault restoration unit restores the faulty domain using the backup data in the main domain.

6. The faulty restoration apparatus of claim 1, wherein backup data of each of the plurality of domains is stored in a server and the fault restoration unit restores the faulty domain using the backup data in the server.

7. The faulty restoration apparatus of claim 1, wherein backup data of each of the plurality of domains is stored in a network file system (NFS) and the fault restoration unit restores the faulty domain using the backup data in the NFS.

8. The fault restoration apparatus of claim 1, wherein the backup data of the faulty domain includes an OS kernel image at the time of shipment of the faulty domain, information on a number of applications installed by the OS of the faulty domain, system configuration information set or updated by the OS of the faulty domain, and user data information set or updated by a user of the faulty domain.

9. The faulty restoration apparatus of claim 1, wherein backup data of a faulty domain is backed up to a server or one of the plurality of domains selected as a main domain, and the backup data of the faulty domain is also backed up to at least one non-main domains.

10. A fault restoration method for use in a in a virtual environment in which a plurality of domains each having an operating system (OS) and one or more applications are run, the fault restoration method comprising:
    monitoring fault state values of the plurality of domains;

detecting a faulty domain from the plurality of domains by comparing the fault state values of the plurality of domains with a threshold; and restoring the faulty domain by reloading the OS of the faulty domain and in response to the faulty domain not being restored by reloading the OS of the faulty domain. restoring the faulty domain using backup data of the faulty domain.

11. The fault restoration method of claim 10, wherein the fault state values of the plurality of domains include counter values that increase periodically.

12. The fault restoration method of claim 11, wherein the detecting of the faulty domain comprises determining a domain that has a counter value that does not increase for a predefined amount of time as the faulty domain.

13. The fault restoration method of claim 11, wherein the detecting of the faulty domain comprises determining a domain that has a counter value that is updated less than a predefined number of times during a predefined amount of time as the faulty domain.

14. The fault restoration method of claim 10, wherein the restoring of the faulty domain comprises restoring the faulty domain using backup data present in at least one of an NFS and one of the plurality of domains selected as a main domain.

15. The faulty restoration method of claim 10, wherein the backup data of the faulty domain includes an OS kernel image at the time of shipment of the faulty domain, information on a number of applications installed by the OS of the faulty domain, system configuration information set or updated by the OS of the faulty domain, and user data information set or updated by a user of the faulty domain.

16. The faulty restoration method of claim 10, wherein the backup data of the faulty domain is backed up to a server or one of the plurality of domains selected as a main domain, and the backup data of the faulty domain is further backed up to at least one of the other non-main domains.

17. A fault restoration apparatus for use in a virtual environment, the fault restoration apparatus comprising:
a domain monitoring unit configured to monitor fault state values of at least one operating system (OS);
a fault determination unit configured to compare the fault state value of the at least one operating system with a threshold and configured to determine whether the at least one operating system is a faulty operating system based on the comparison;
a fault restoration unit configured to restore the faulty operating system by reloading the OS of the faulty domain and in response to the faulty domain not being restored by reloading the OS of the faulty domain, the fault restoration unit restores the faulty domain using backup data of the faulty domain; and
a processor configured to operate at least one of the domain monitoring unit, the fault determination unit, and the fault restoration unit.

* * * * *